United States Patent
Torbjörnsson et al.

(10) Patent No.: US 6,260,421 B1
(45) Date of Patent: Jul. 17, 2001

(54) TORQUE TRANSMITTER

(75) Inventors: Lars-Ove Torbjörnsson, Kungälv; Jan-Erik Wiik, Kungsbacka, both of (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 09/171,436

(22) PCT Filed: Apr. 17, 1997

(86) PCT No.: PCT/SE97/00647

§ 371 Date: May 24, 1999

§ 102(e) Date: May 24, 1999

(87) PCT Pub. No.: WO97/40354

PCT Pub. Date: Oct. 30, 1997

(30) Foreign Application Priority Data

Apr. 19, 1996 (SE) .................................... 9601510

(51) Int. Cl.$^7$ ........................................................ G01L 3/02
(52) U.S. Cl. ...................................................... 73/862.331
(58) Field of Search ........................ 73/862.333, 862.331, 73/862.334, 862.335, 862.193

(56) References Cited

U.S. PATENT DOCUMENTS

| | | | |
|---|---|---|---|
| 3,740,999 | * 6/1973 | Whitehouse | 73/862.21 |
| 4,712,433 | * 12/1987 | Hochstein et al. | 73/862.334 |
| 4,873,874 | 10/1989 | Sobel . | |
| 4,885,944 | * 12/1989 | Yagi et al. | 73/862.335 |
| 4,887,461 | 12/1989 | Sugimoto et al. . | |
| 5,115,685 | * 5/1992 | Jorgensen et al. | 73/862.331 |
| 5,375,476 | * 12/1994 | Gray | 73/862.331 |

FOREIGN PATENT DOCUMENTS

| | | |
|---|---|---|
| 0 556 734 A2 | 8/1993 | (EP) . |
| 452 509 | 11/1987 | (SE) . |
| 95/27191 A1 | 10/1995 | (WO) . |
| 95/35487 A1 | 12/1995 | (WO) . |

* cited by examiner

*Primary Examiner*—Max Noori
(74) *Attorney, Agent, or Firm*—Kilpatrick Stockton LLP

(57) ABSTRACT

Method and device for increasing the accuracy when performing measurements with a torque sensor (1, 2) in engines, which is mounted substantially concentrically in connection to a rotatable shaft (12), where said torque sensor (1, 2) is constituted by at least one coil (20, 22), and at least one zone (30) which is provided with parallel lines of a suitable conductive material such as copper. The coil (20, 22) is provided with connections for measuring the voltage, whereby the rotatable shaft (12) has a recess (50, 52). The zone (30) is either placed on the inner envelope surface of the recess (52) where said zone (30) encloses a stationary coil (22) which is journalled in the recess (52), or on an outer envelope surface of a measuring shaft (10) attached in the recess (50), which is enclosed by a stationary coil (20).

26 Claims, 4 Drawing Sheets

TORQUE TRANSMITTER

TECHNICAL FIELD

The present invention relates to a method and a device for mounting a torque sensor in engines.

BACKGROUND OF THE INVENTION

It has been long known how a torque sensor may be designed in order to measure torsional moments on shafts in engines, for instance in vehicles. The torque sensor may provide a contactless measurement by means of, for instance, utilizing a transductor of a magneto-elastic type which is symmetrically shaped around a shaft, i.e. an inductive measurement. Other ways of measuring torsional moments may, for instance, be through strain sensors (for instance through trailing contacts and telemetry, i.e. resistively, capacitive measurement, optical measurement, transformer technique (transfer from primary to secondary winding), telemetry or a torductor (measure the change in the magnetic properties of a shaft).

One way of measuring torque on a shaft by using a torque sensor of a magneto-elastic type which is symmetrically designed around the shaft is previously known from U.S. Pat. No. 4,873,874. The torque sensor is furnished with three stationary coils, connected in series, in order to magnetize the shaft, and three further coils in order to detect the transferred torque in the shaft. Furthermore, the shaft is provided with three parallel, annular zones, designed in such a way that the magnetic field in the shaft may be deflected by at least 45° in order to obtain good sensitivity of the torque sensor. An advantage with this torque sensor is that it reduces the sensitivity to temperature gradients in a reliable way.

Certain problems may, however, occur when mounting a sensor according to the solution in U.S. Pat. No. 4,873,874, since the mounting requires high precision and is thus work intensive. Furthermore, unnecessary wear of the zones occurs should the shaft not be sufficiently centered in relation to the coils.

SUMMARY OF THE INVENTION

Consequently, it is an object of the present invention to provide a device and a method for increasing the accuracy, the service life, the reliability, for obtaining a better centering and less play between the different components of the torque sensor and when mounting a torque sensor in engines and driving transmissions in general.

Another object is to obtain better accessibility and easier mounting of a torque sensor in engines.

In accordance with the present invention, these above-mentioned objects are achieved by means of providing a method and method in accordance with.

Preferred embodiments of the method and the device, in accordance with the invention, are disclosed in further detail herein.

BRIEF DESCRIPTION OF THE DRAWINGS

The invention will become clearer from the following description, with preferred embodiments shown as examples with reference to the attached drawings, in which.

PREFERRED EMBODIMENTS

Figure 1:
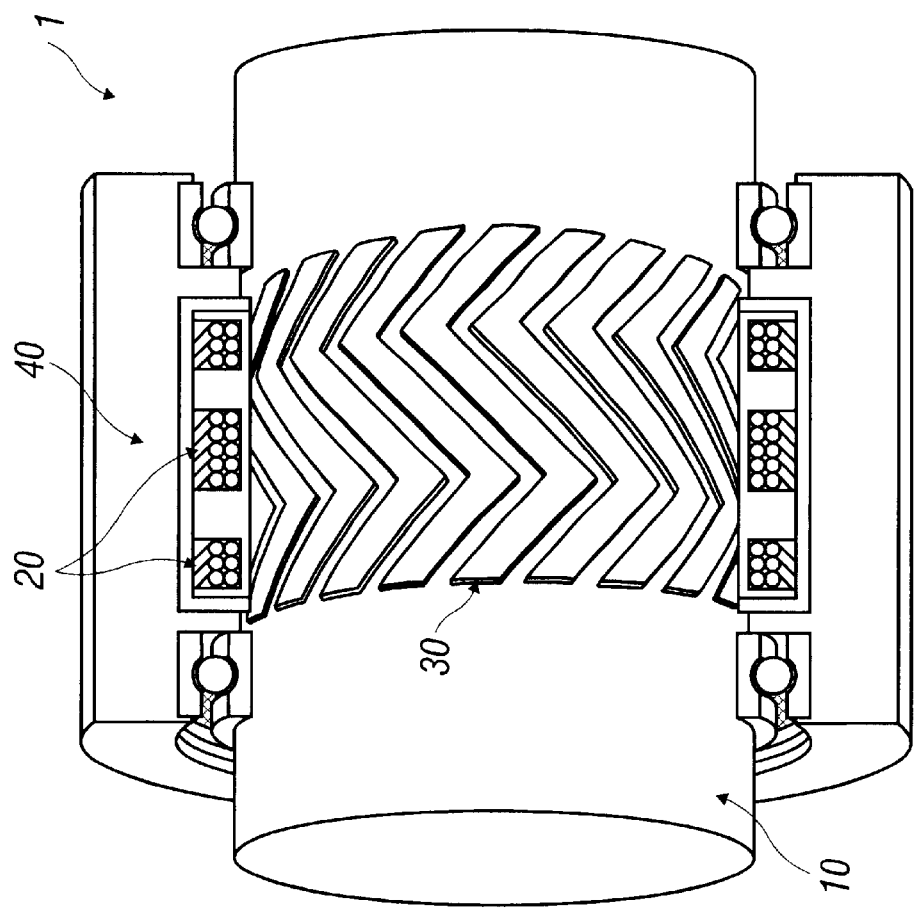
FIG. 1 shows an embodiment of a magneto-elastic torque sensor.

With reference to FIG. 1, a magneto-elastic torque sensor 1 is shown, which is arranged substantially concentrically in connection to a rotatable measuring shaft 10. Furthermore, the torque sensor is provided with at least one coil 20, preferably three coils, and at least one zone 30, preferably three zones. The zones may be constituted of parallel lines of, for instance, a suitable material on the shaft 10, e.g. a conductive material such as copper, and are displaced substantially 45° in relation to the length direction of the shaft. Furthermore, said coil is provided with an enclosing cover 40, for instance, of a magnetic material, and connections to the coils in order to measure a signal, for instance, voltage or current.

Figure 2:
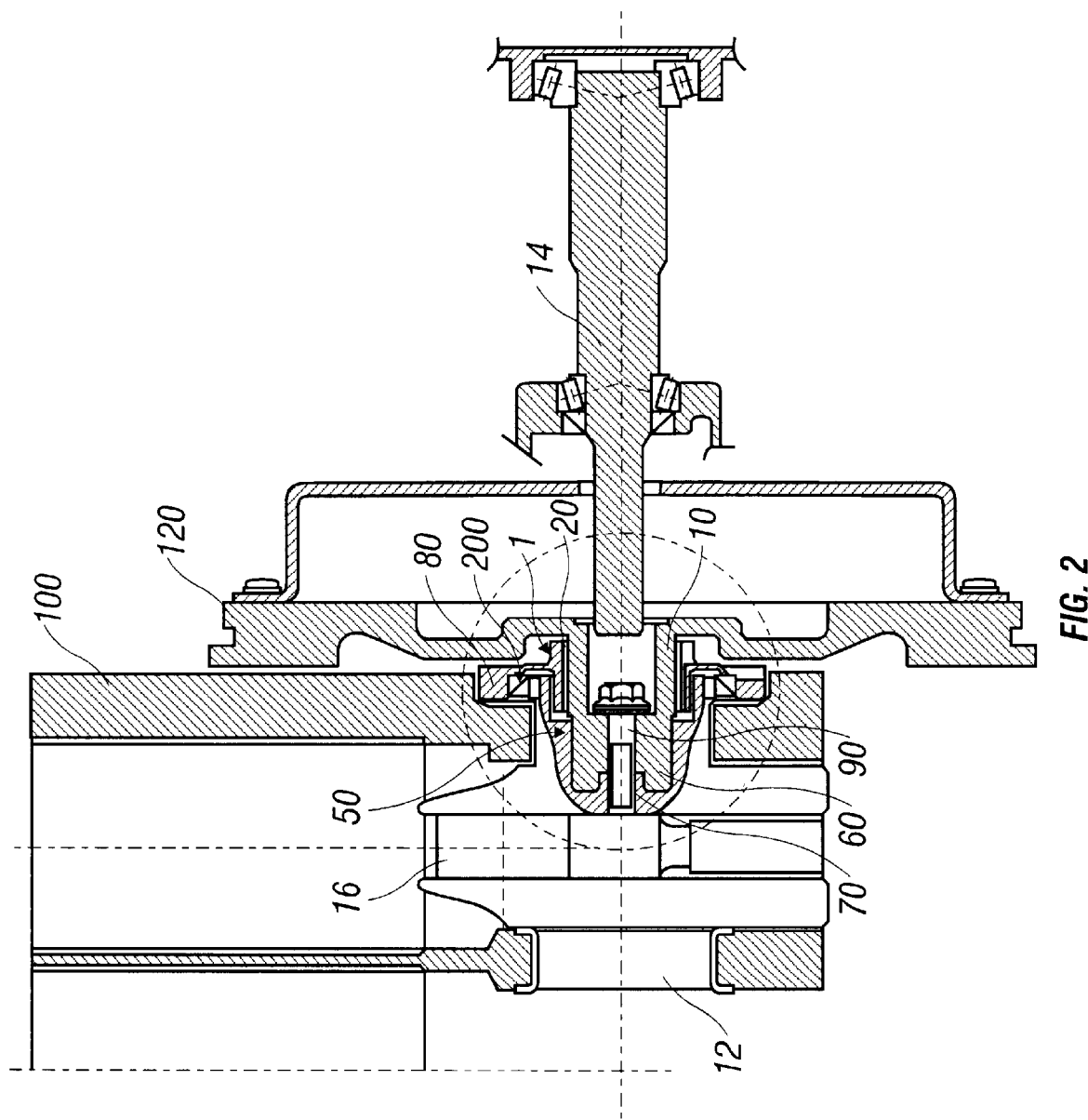
FIG. 2 shows a first preferred embodiment of a torque sensor in accordance with the present invention.

In FIG. 2, an embodiment of a torque sensor 1 is shown, for instance the one which was shown in FIG. 1, which is mounted on or in connection to a rotatable shaft 12, for instance a crankshaft with appurtenant crank 16, which is provided with a substantially cylindrical recess 50, where at least one zone 30 (not shown in FIG. 2) on the sensor, preferably three zones, may be placed on an external envelope surface of a measuring shaft 10, attached in the recess 50. The zones may either be pressed into, plated, glued onto or in another way be mounted to an outer envelope surface of the measuring shaft. A transfer shaft 14, preferably a transmission shaft, may further be combined in connection to said rotating shaft 12. The zones may be constituted of parallel lines of a conductive material on the shaft 10, preferably copper. The measuring shaft 10 is further concentrically surrounded by at least one, preferably three, stationary coils 20. One way of attaching the measuring shaft 10 to the rotatable shaft 12 is via a mechanical joint 60, for instance splines, and/or to provide a concentric aperture 70 through the measuring shaft 10 and the rotatable shaft 12 and to fix/lock these with a bolt 90 or a screw through the concentric aperture 70. The measuring shaft 10 may, for instance, be constituted of a magneto-elastic material.

Furthermore, the rotating measuring shaft 10 may be enclosed by a yoke 80, whereby the construction of the yoke enables axial adjustment both before and after mounting, i.e. the yoke 80 may be trimmed in about the measuring shaft 10 and in this way the accuracy may be improved. If, furthermore, the measuring shaft 10 is fixed/locked axially to the rotating shaft 12, by means of said bolt 90 or screw, play and movement in the sensor are minimized.

Furthermore, the rotating shaft passes through an engine block 100 with a parting line, i.e. cylinder block and bottom. Furthermore, the yoke 80 may be constituted by an inner and an outer cylindrical member, which are joined by a thin disc-shaped member. The coil may accordingly be attached to the inner cylindrical member of the yoke by means of press fitting, gluing etc. (see FIG. 2a).

Figure 2A:
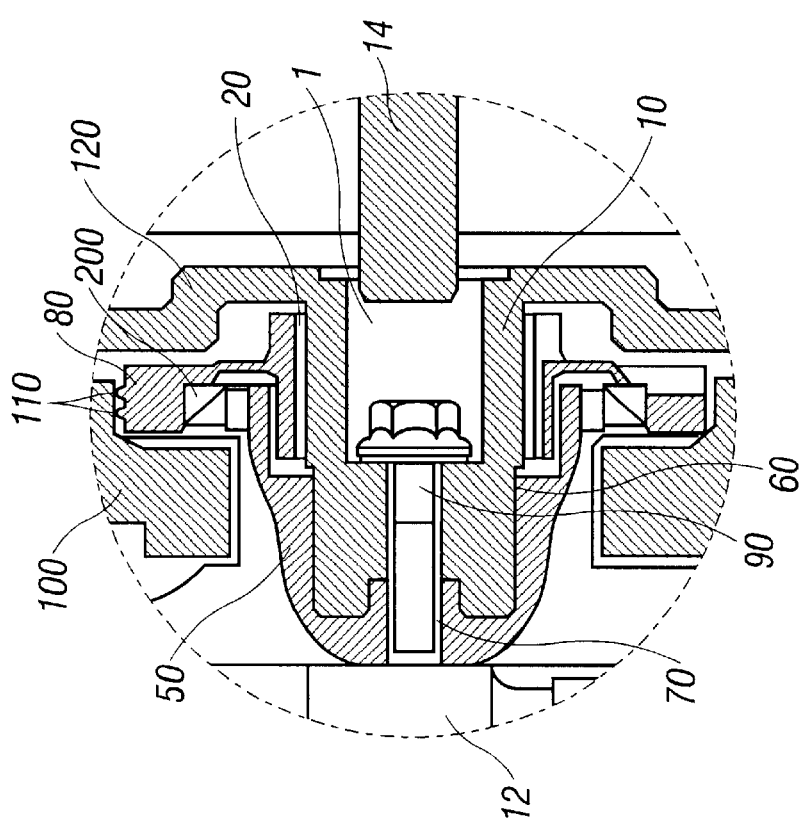
FIG. 2a shows an enlarged view of FIG. 2.

Furthermore, the yoke 80 may be mounted in a recess, which may be cylindrically designed in the engine block 100, at the same time as the yoke 80 is mounted about the rotating shaft 12. In order to achieve optimum centering, at the same time as the tensions which may arise in a bearing (for instance a plain bearing) on the rotating shaft are minimized, the outer cylindrical member of the yoke 80 is conveniently provided with a pair of circumferential cutting edges 110, as shown in FIG. 2a. When mounting, these edges 110 cut into the engine block 100 at the same time as they are partially deformed, which brings about effective centering and locking without transferring tensions to the bearing on the rotating shaft 12.

Other types of bearings than plain bearings may, for instance, be constituted by ball bearings, roller bearings or self-aligning roller bearings. These other types of bearings may provide a more stable rotating shaft than when a plain bearing is used.

The sealing between the yoke 80 and the engine block 100 may be constituted by sealing liquid, for instance Loctite (registered trademark), around the outer periphery of the outer cylinder and also a seal ring 200 around its inner periphery.

Furthermore, the measuring shaft 10 may be mounted in a similar way as described earlier, i.e. at the end of the crankshaft 12 via a splined coupling 60, locked with a bolt 90 and at the same time sealed with sealing liquid, for instance Loctite (registered trademark). The outer portion of the measuring shaft 10 is, for instance through welding, attached to a flywheel 120, preferably an easy-to-bend flywheel which allows certain movement of the flywheel 120 in an axial direction. Before mounting, the measuring shaft 10 is coated with magnetic material, and different zones 30 also possibly heat treated.

Furthermore, the crankshaft 12 may be coated directly with magnetic material and different zones 30, in which case the coil is divided in order to enable mounting. The purpose of the sealings is to prevent oil leakage from the engine into a transmission.

Figure 3:
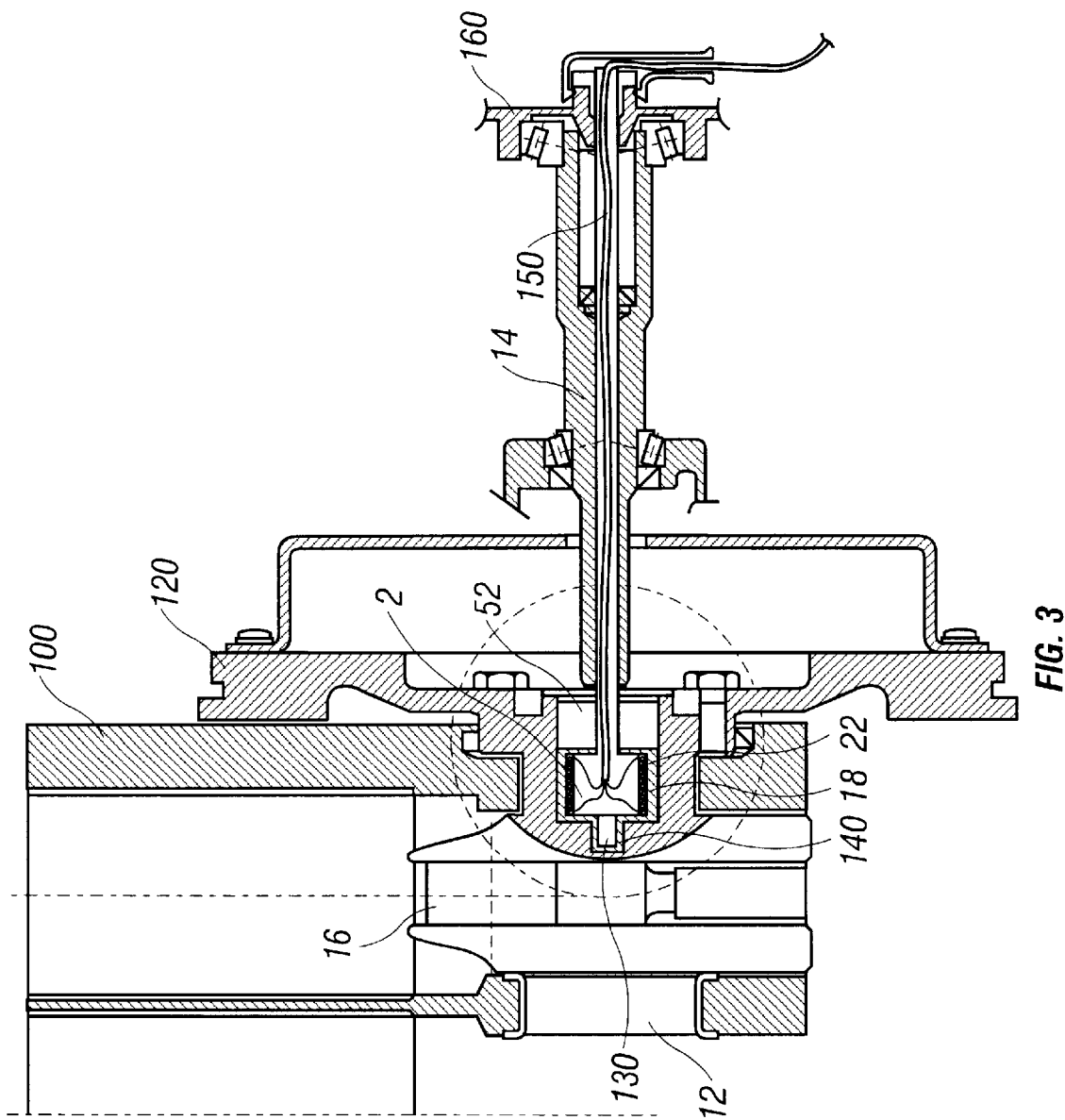
FIG. 3 shows a second preferred embodiment of a torque sensor in accordance with the present invention.
Figure 3A:
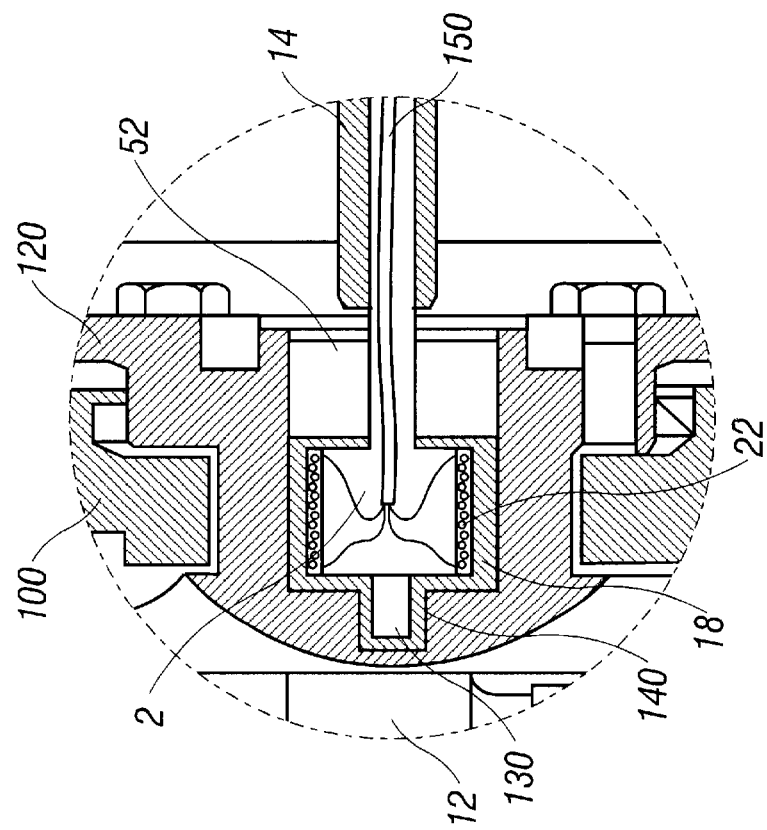
FIG. 3a shows an enlarged view of FIG. 3.

In FIG. 3 an alternative embodiment of a torque sensor 2 is shown, which is mounted on or in connection to a rotatable shaft 12, for instance a crankshaft, which is provided with a recess 52 which is substantially cylindrical, where at least one zone (not shown in FIG. 3), preferably three zones, on the sensor 2 are placed on the inner envelope surface of the recess 52, where said zone concentrically encloses at least one, preferably three stationary coils 22 which are journalled in the recess 52. The zones may either be pressed onto, glued, plated or mounted in another way on an outer envelope surface of a measuring shaft 18 fixed in the recess. A transfer shaft 14, preferably a transmission shaft, may furthermore be combined in connection to said rotating shaft 12. The zones may be constituted by parallel lines of a conductive material, preferably copper. The difference between the sensor in this case and the one which was shown in FIG. 1 is that a suitable material, preferably a magneto-elastic material, is placed on the inside of a substantially cylindrical surface, instead of on the outside. The zone is, furthermore, mounted inside a substantially cylindrical measuring body 18, which is situated in a recess in the end of the rotating shaft 12 and wherein said measuring body 18 is mounted essentially concentrically enclosing said coil(s) 22 (see FIG. 3a). The connections to the journalled coil may be lead through a tube 150, which runs freely through a rotating transmission shaft, which is coaxial with the crankshaft 12. This tube 150 will be described in detail below. As was mentioned earlier, the coiling may be divided into a number of zones, which in themselves consist of previously known separate groups of coiling or coils 22 (see e.g. U.S. Pat. No. 4,873,874), but for reasons of simplicity these are designated as a unit ("the coil") in the following.

The measuring body 18 may be connected to the recess 52 in the crankshaft 12 by means of being pressed or glued into position. It is also possible to plate the magneto-elastic material directly on the cylindrical surface of the recess 52.

The position may, for instance, be chosen somewhere between the flywheel 120 and the last crank 16, for instance radially inside the crank bearing.

The stationary coil 22 is provided with a pin 130 in the end facing the crankshaft, and is journalled by e.g. a flanged bearing 140 in the interior of the recess 52. The bearing may receive radial forces, but it is an advantage if it also can tolerate axial forces. It should, for instance, be possible to spring-load the coil 22 so that it follows axial movements of the crankshaft 12. The coil 22 may be built up by means of winding the wire around a cylindrical body, whereby the wires are placed in tracks and/or are moulded into or coated with a suitable material in order to fixate them.

In the other end of the coil, a tube 150 is mounted. The tube 150 may be mounted firmly or elastically in the end of the coil, or optionally be a through tube. In order to facilitate the mounting of the gearbox, the tube may also be mounted afterwards, with the aid of a press joint or some kind of quick-coupling.

In operation, the coil 22 is journalled in the transfer shaft 14 in one end, and in the other end connected firmly or elastically to one end of the tube 150 which runs in a through hole in the transfer shaft 14, for instance a transmission shaft, which is coaxial with the crankshaft and is connected to this via a flywheel 120. The other end of the tube may be located inside a transmission casing 160 with an expander roll or the like and be sealed with e.g. an O-ring. The tube 150 may also be provided with an outer sealing gasket which contacts the hollow transfer shaft 14. If the gasket is placed close to the middle of the tube, it functions as a support and a bearing, so that any sudden jerks in the shaft do not affect the tube, i.e. so that the shaft and the tube do not come into contact with each other.

The electrical connections run from the coil, through the tube 150, to sensor electronics, for instance driver and evaluation unit (see U.S. Pat. No. 4,873,874).

Still another way of mounting the coil 20 (FIG. 2), in the case when the rotating shaft 12 has a circumferential recess (not shown) with a certain extension in a radial direction, may be directly onto the shaft instead of a cylindrical recess. In this way the coil 20 may, for instance, be placed in connection to a bearing. The zones on the measuring shaft may in that case be arranged directly on the rotating shaft.

Even if the shown embodiments of the present invention have been described in detail, with reference to the accompanying drawings, it must be understood that the invention is not limited to these specific embodiments, and that different changes or modifications may be achieved by the skilled person without departing from the scope which is defined by the subsequent claims. For instance, other types of torque sensors may be utilized such as: strain sensors, capacitive sensors, optical sensors, transformer technique (transfer from primary to secondary winding) and torductor sensors.

What is claimed is:

1. Method for mounting a torque sensor in engines and driving transmissions, which is mounted substantially concentrically in connection to a rotatable shaft, where said torque sensor is constituted by at least one stationary coil and at least one zone which is provided with parallel lines of a conductive material, and where said coil is placed in connection to said zone and is provided with connections for measuring signals, where the rotatable shaft is constituted by a crankshaft which is provided with a recess, whereby said zone is placed on an outer envelope surface of a measuring shaft, attached in the recess and enclosed by a stationary coil, said measuring shaft and said recess each are provided with an aperture, which jointly accept a bolt or a screw through said aperture, in order to attach the recess and the measuring shaft with respect to reducing play and movement between said crankshaft and said measuring shaft.

2. The method according to claim 1, wherein the number of zones is at least two and alternatingly displaced by substantially 45° in relation to the longitudinal direction of the measuring shaft.

3. Method for mounting a torque sensor in engines and driving transmissions, which is mounted substantially concentrically in connection to a rotatable shaft, whereby the rotatable shaft is constituted by a crankshaft which is provided with a peripheral recess, where said torque sensor is constituted by at least one stationary coil and at least one zone which is provided with parallel lines of a conductive material, said coil is placed in said recess and in connection to said zone and is provided with connections for measuring signals, whereby said zone is placed concentrically around the stationary coil inside the recess, wherein said coil is journalled in an interior of said recess and that the connections of said sensor are led through a tube which runs freely through a rotating transfer shaft.

4. The method according to claim 3, wherein the number of zones is at least two, said zones being alternatingly displaced by substantially 45° in relation to the longitudinal direction of the recess.

5. The method according to claim 3, wherein said zone is placed on an inner envelope surface of the recess, and where said zone encloses the stationary coil in the recess.

6. The method according to claim 3, wherein a substantially cylindrical measuring body is placed inside said recess and encloses said coil, whereby said zone is placed on an outer envelope surface of the measuring body, and where said zone encloses the stationary coil in the recess.

7. Device for mounting a sensor in engines and driving transmissions, which is arranged substantially concentrically in connection to a rotatable shaft, where said sensor is constituted by at least one coil and at least one zone provided with parallel lines of a conductive material, where said coil is provided with connections for measuring signals, whereby the rotatable shaft is constituted by a crankshaft which is provided with a recess, whereby said zone is arranged at an outer envelope surface of a measuring shaft which is attached in the recess and enclosed by a stationary coil, wherein said measuring shaft and said recess are each provided with an aperture, which accommodates a bolt or a screw passing through said aperture, in order to attach the recess and the measuring shaft to thereby reduce play and movement between said crankshaft and said measuring shaft.

8. The device according to claim 7, wherein the recess is substantially cylindrical.

9. The device according to claim 7, wherein the number of zones is at least two, said zones being displaced substantially 45° in relation to a longitudinal direction of the measuring shaft.

10. Device for mounting a sensor in engines and driving transmissions, which is arranged substantially concentrically in connection to a rotatable shaft, whereby the rotatable shaft is constituted by a crankshaft and is provided with a peripheral recess, where said sensor is constituted by at least one stationary coil and at least one zone provided with parallel lines of a conductive material, where said coil is arranged in said recess and in connection to said zone and provided with connections for measuring signals, whereby said zone is placed concentrically around the stationary coil in the recess, and wherein said coil is journalled in an interior of said recess and a tube is arranged inside a transfer shaft intended for the connections of said sensor.

11. The device according to claim 10, wherein the recess is substantially cylindrical.

12. The device according to claim 10, wherein the number of zones is at least two, said zones being displaced substantially 45° in relation to a longitudinal direction of the recess.

13. The device according to claim 10, wherein said zone is arranged on an inner envelope surface of the recess and said zone encloses the stationary coil in the recess.

14. The device according to claim 10, wherein a substantially cylindrical measuring body is arranged inside said recess enclosing said coil, whereby said zone is arranged at an inner envelope surface of the measuring body, and where said zone encloses the stationary coil in the recess.

15. The method according to claim 4, wherein said zone is placed on an inner envelope surface of the recess, and where said zone encloses the stationary coil in the recess.

16. The method according to claim 4, wherein a substantially cylindrical measuring body is placed inside said recess and encloses said coil, whereby said zone is placed on an outer envelope surface of the measuring body, and where said zone encloses the stationary coil in the recess.

17. The device according to claim 8, wherein the number of zones is at least two, said zones being displaced substantially 45° in relation to a longitudinal direction of the measuring shaft.

18. The device according to claim 11, wherein the number of zones is at least two, said zones being displaced substantially 45° in relation to a longitudinal direction of the recess.

19. The device according to claim 11, wherein said zone is arranged on an inner envelope surface of the recess and said zone encloses the stationary coil in the recess.

20. The device according to claim 12, wherein said zone is arranged on an inner envelope surface of the recess and said zone encloses the stationary coil in the recess.

21. The device according to claim 11, wherein a substantially cylindrical measuring body is arranged inside said recess enclosing said coil, whereby said zone is arranged at an inner envelope surface of the measuring body, and where said zone encloses the stationary coil in the recess.

22. The device according to claim 12, wherein a substantially cylindrical measuring body is arranged inside said recess enclosing said coil, whereby said zone is arranged at an inner envelope surface of the measuring body, and where said zone encloses the stationary coil in the recess.

23. The method according to claim 3, wherein a substantially cylindrically measuring body is placed inside said recess and encloses said coil, whereby said zone is placed on an inner envelope surface of the measuring body, and where said zone encloses the stationary coil in the recess.

24. The method according to claim 4, wherein a substantially cylindrically measuring body is placed inside said recess and encloses said coil, whereby said zone is placed on an inner envelope surface of the measuring body, and where said zone encloses the stationary coil in the recess.

25. The device according to claim 11, wherein a substantially cylindrical measuring body is arranged inside said recess enclosing said coil, whereby said zone is arranged at an outer envelope surface of the measuring body, and where said zone encloses the stationary coil in the recess.

26. The device according to claim 12, wherein a substantially cylindrical measuring body is arranged inside said recess enclosing said coil, whereby said zone is arranged at an outer envelope surface of the measuring body, and where said zone encloses the stationary coil in the recess.

* * * * *